Figure 1:
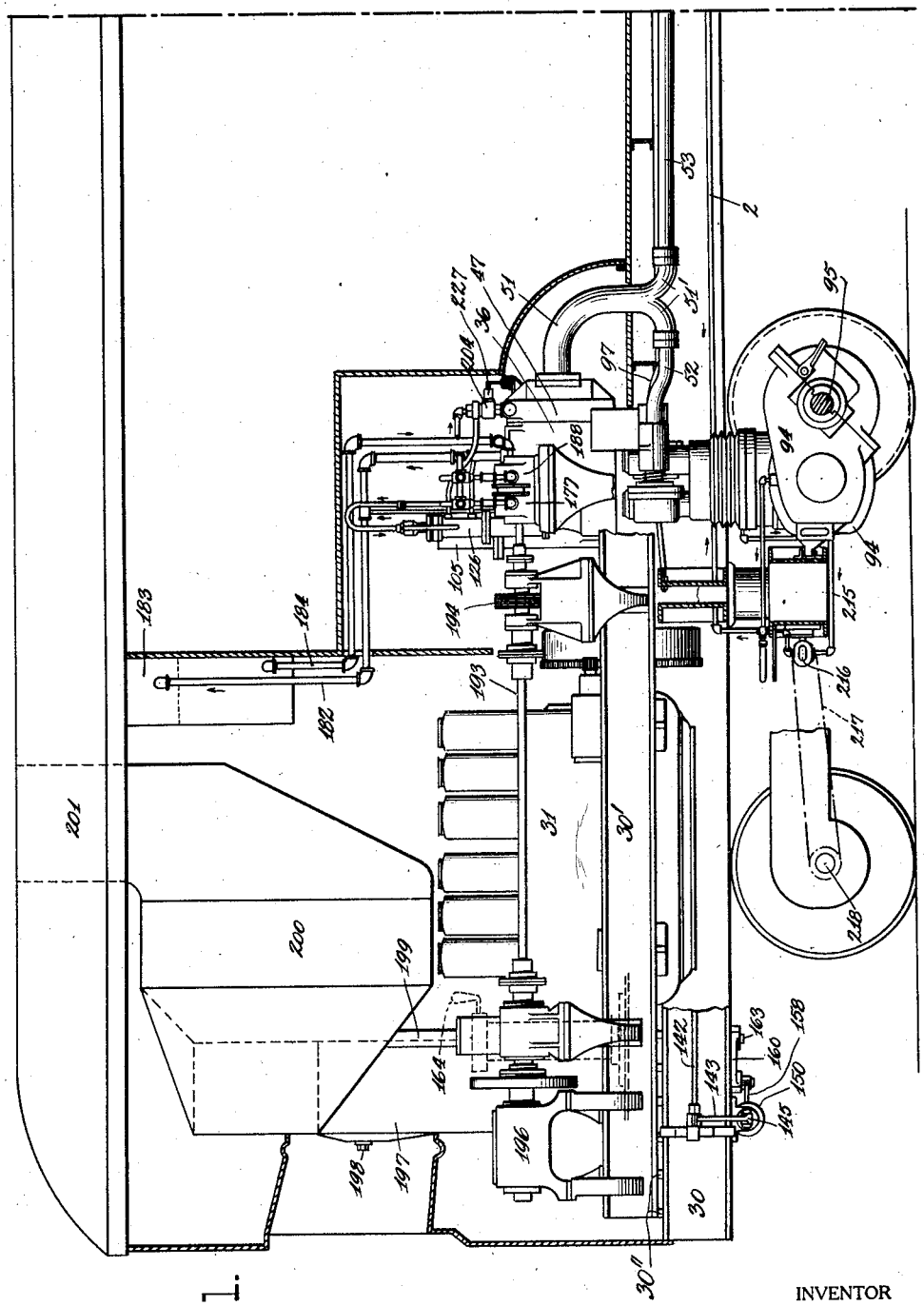

Aug. 7, 1928.

J. ROBSON 1,679,544

POWER PLANT, ESPECIALLY FOR SELF PROPELLED VEHICLES

Filed Nov. 12, 1923   10 Sheets-Sheet 1

INVENTOR
John Robson
BY
ATTORNEYS.

Aug. 7, 1928.

J. ROBSON 1,679,544

POWER PLANT, ESPECIALLY FOR SELF PROPELLED VEHICLES

Filed Nov. 12, 1923   10 Sheets-Sheet 2

INVENTOR
John Robson
BY
*Lotka, Ahlenbuck & Mathé*
ATTORNEYS.

Aug. 7, 1928.  1,679,544
J. ROBSON
POWER PLANT, ESPECIALLY FOR SELF PROPELLED VEHICLES
Filed Nov. 12, 1923    10 Sheets-Sheet 3

INVENTOR
John Robson
BY
Lotka, Uhlenbeck & Mathé
ATTORNEYS

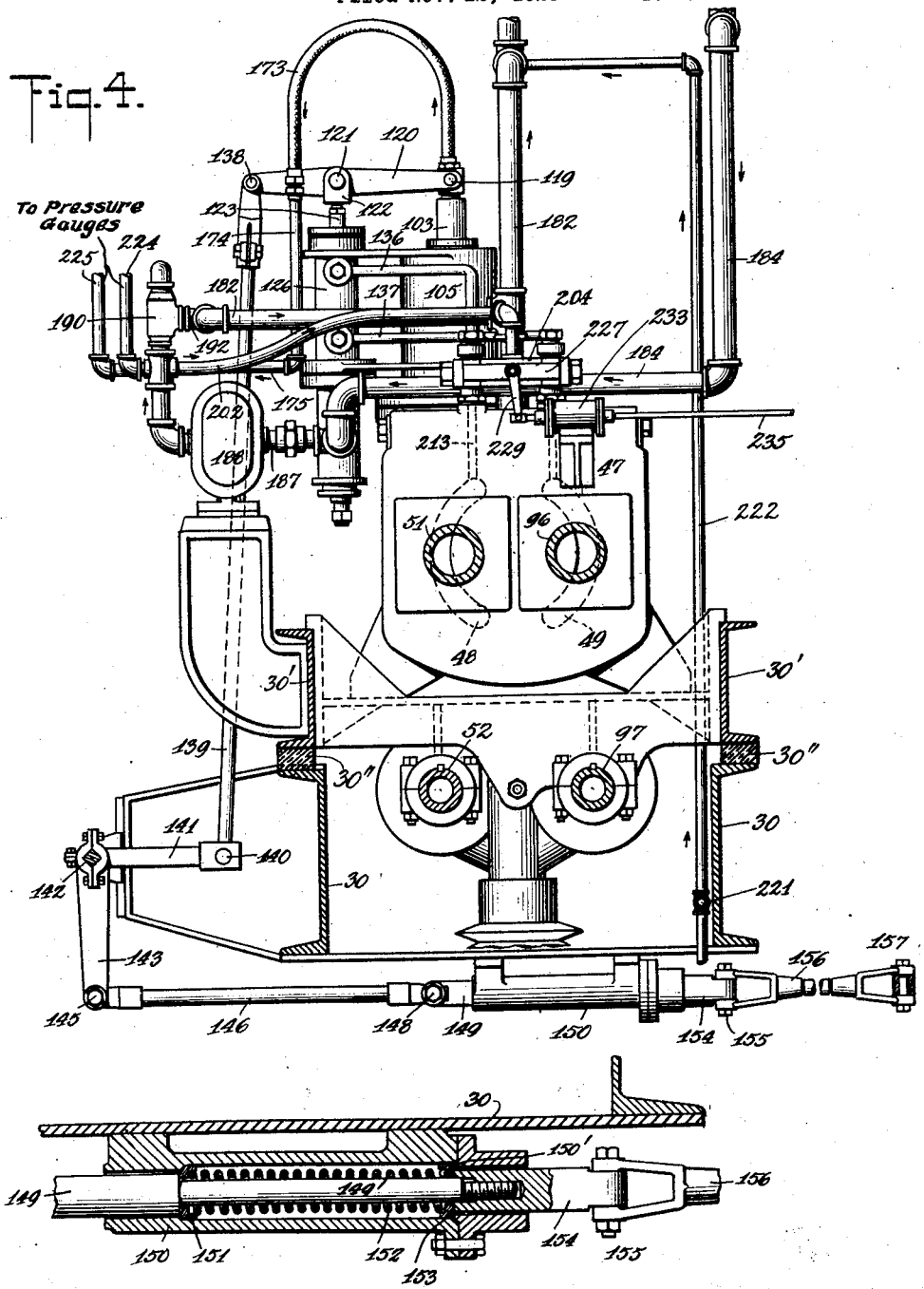

Aug. 7, 1928.

J. ROBSON 1,679,544

POWER PLANT, ESPECIALLY FOR SELF PROPELLED VEHICLES

Filed Nov. 12, 1923     10 Sheets-Sheet 5

INVENTOR
John Robson
BY
Lotka, Kehlenbeck & Mathé
ATTORNEYS.

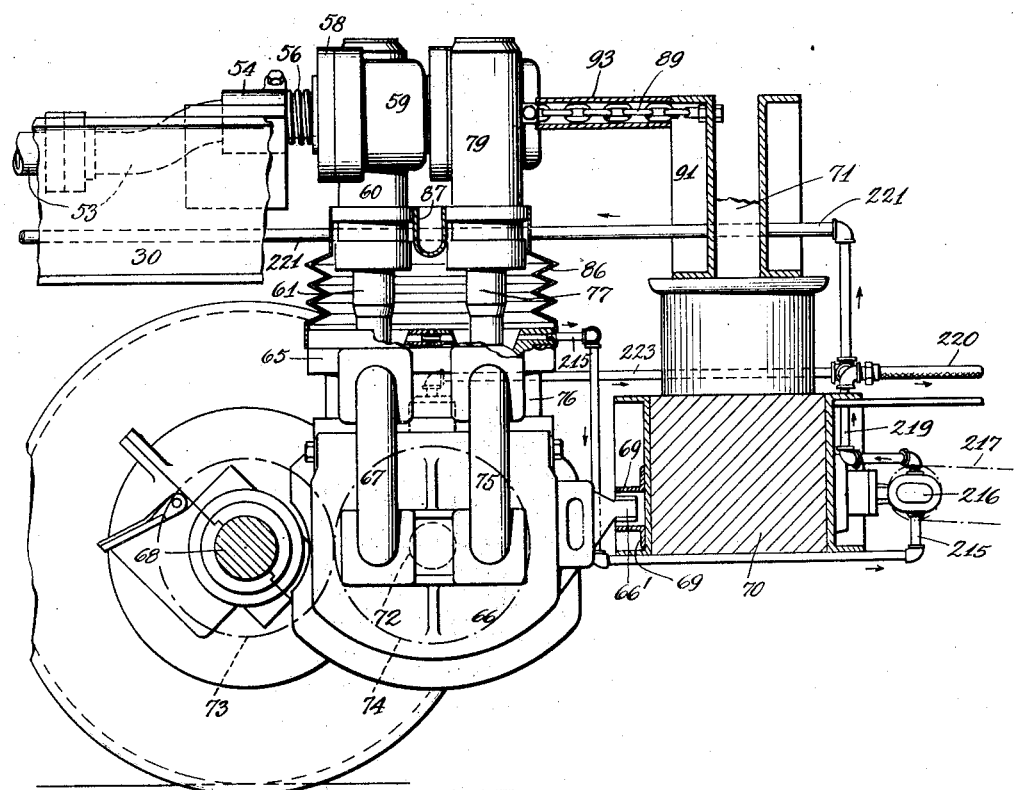

Aug. 7, 1928. 1,679,544
J. ROBSON
POWER PLANT, ESPECIALLY FOR SELF PROPELLED VEHICLES
Filed Nov. 12, 1923 10 Sheets-Sheet 7
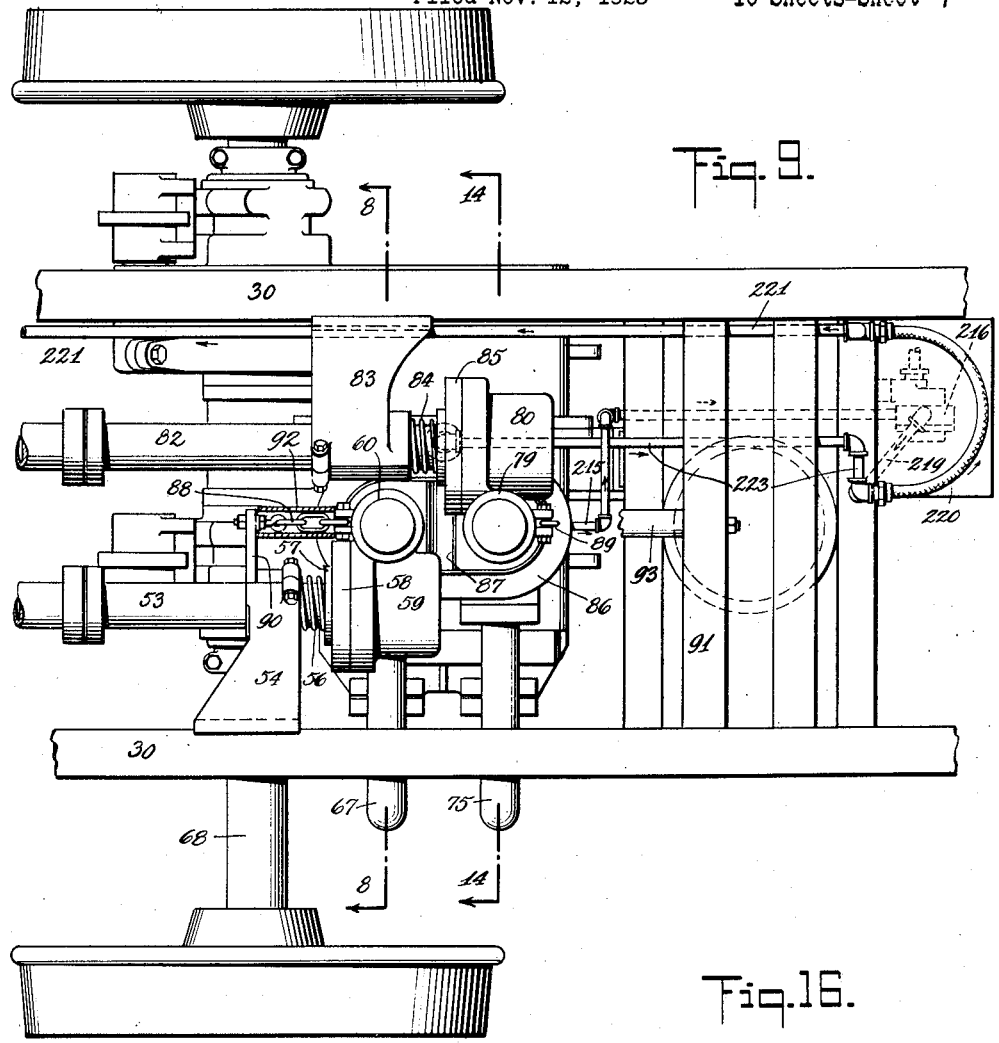
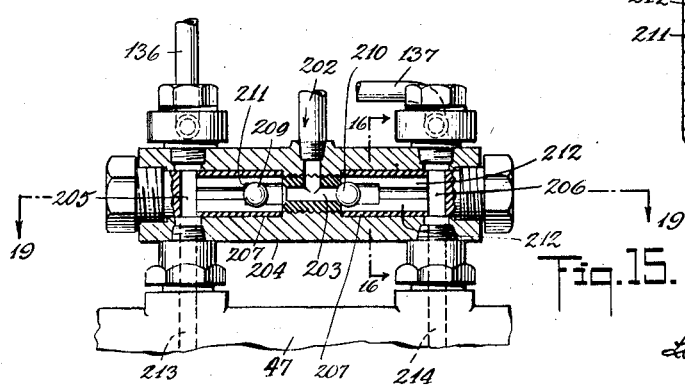
INVENTOR
John Robson
BY
ATTORNEYS.

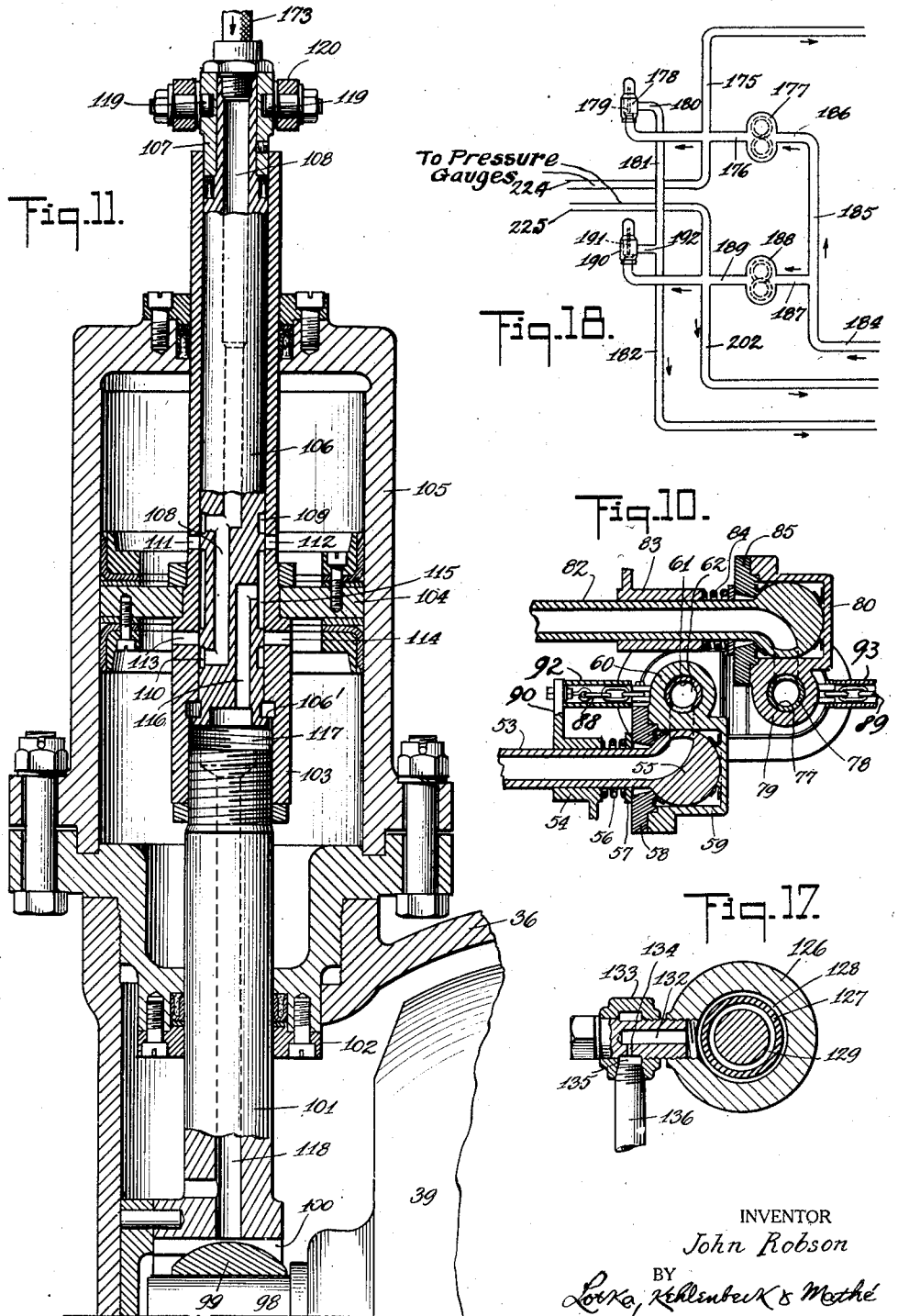

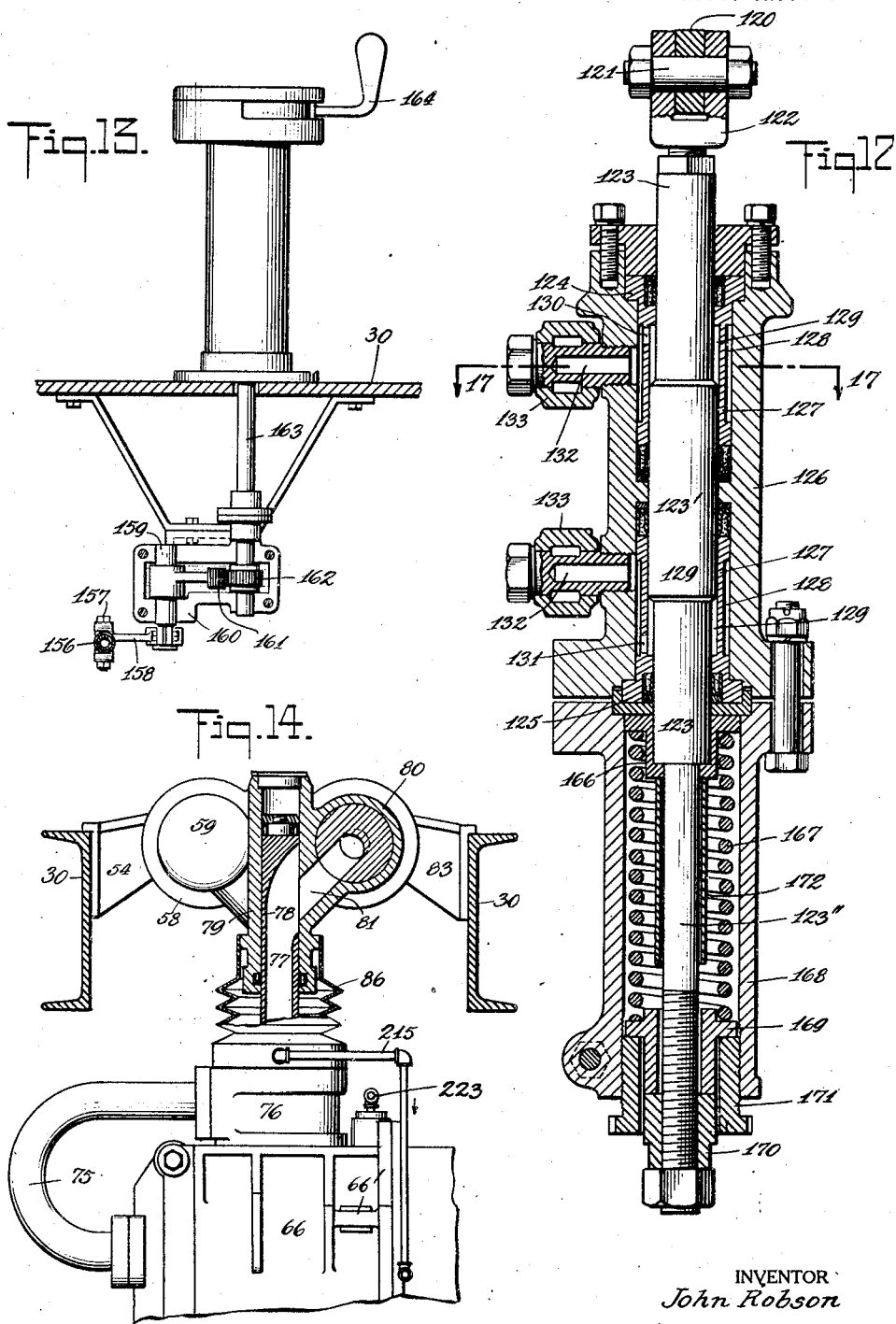

Aug. 7, 1928.

J. ROBSON 1,679,544

POWER PLANT, ESPECIALLY FOR SELF PROPELLED VEHICLES

Filed Nov. 12, 1923    10 Sheets-Sheet 10

INVENTOR
John Robson
BY
*Locke, Kehlenbeck & Wathe*
ATTORNEYS.

Patented Aug. 7, 1928.

1,679,544

UNITED STATES PATENT OFFICE.

JOHN ROBSON, OF WATERBURY, CONNECTICUT, ASSIGNOR TO UNIVERSAL ENGINEERING CORPORATION, OF MONTREAL, QUEBEC, CANADA, A CORPORATION OF CANADA.

POWER PLANT, ESPECIALLY FOR SELF-PROPELLED VEHICLES.

Application filed November 12, 1923. Serial No. 674,246.

The present invention relates to power plants, and while susceptible of general application, has been designed particularly for use in connection with self-propelled vehicles. The specific embodiment of the invention illustrated by the accompanying drawings is a car adapted to run on railway rails and having a power plant including a gasoline engine or other internal combustion motor.

Before giving a detailed description of the particular embodiment illustrated herein, I will indicate briefly some of the salient features which distinguish the present invention from earlier constructions, including certain power plants invented by myself and forming the subject matter of pending applications.

One of the important novel features of the present invention is a special construction of the pipe connections serving for the passage of the power-transmitting fluid from the pump section of the power plant to the section in which the fluid (generally oil) propelled by pump action operates as a driving fluid, and also for the return of such fluid from the last-named or motor section to the pump section. One of the purposes of the present invention is to construct said pipe connections in such a manner as to provide increased flexibility, particularly in view of the conditions existing in the case of a car of relatively considerable length. For this purpose, a novel construction of flexible joints has been devised, such joints, in their preferred form, being of the ball type and mounted in a peculiar manner to allow them to move with sufficient freedom, through a limited range, and yet preserve their tightness throughout such range of movement.

Another important feature of the present invention relates to the provision of a special servo-motor control in connection with a variable speed gear comprising a pump of variable output and motor mechanism operated by the fluid propelled by such pump; in connection with this feature, I employ a small pump to provide the pressure actuating the servo-motor, whereas in certain earlier apparatus invented by me such pressure operating the servo-motor was supplied by the main pump, that is, by the pump forming part of the variable speed gear.

Still another important feature of this invention consists in providing means for maintainng a definite pressure within the suction part of the variable speed gear connections that is, in that part which leads from the outlet of the motor section to the inlet or suction port of the pump section of said gear; the purpose of this particular feature of the improvements is to prevent air from being drawn into the suction connections in the event of a leak.

The invention also deals with various other features relating to means for circulating the oil, for restoring leakage, for combining, in a novel way, an automatic and a manual pressure control, and for obtaining other improved or new useful results in apparatus of the class indicated as will appear from the accompanying drawings and from the description following hereinafter.

Figure 2:
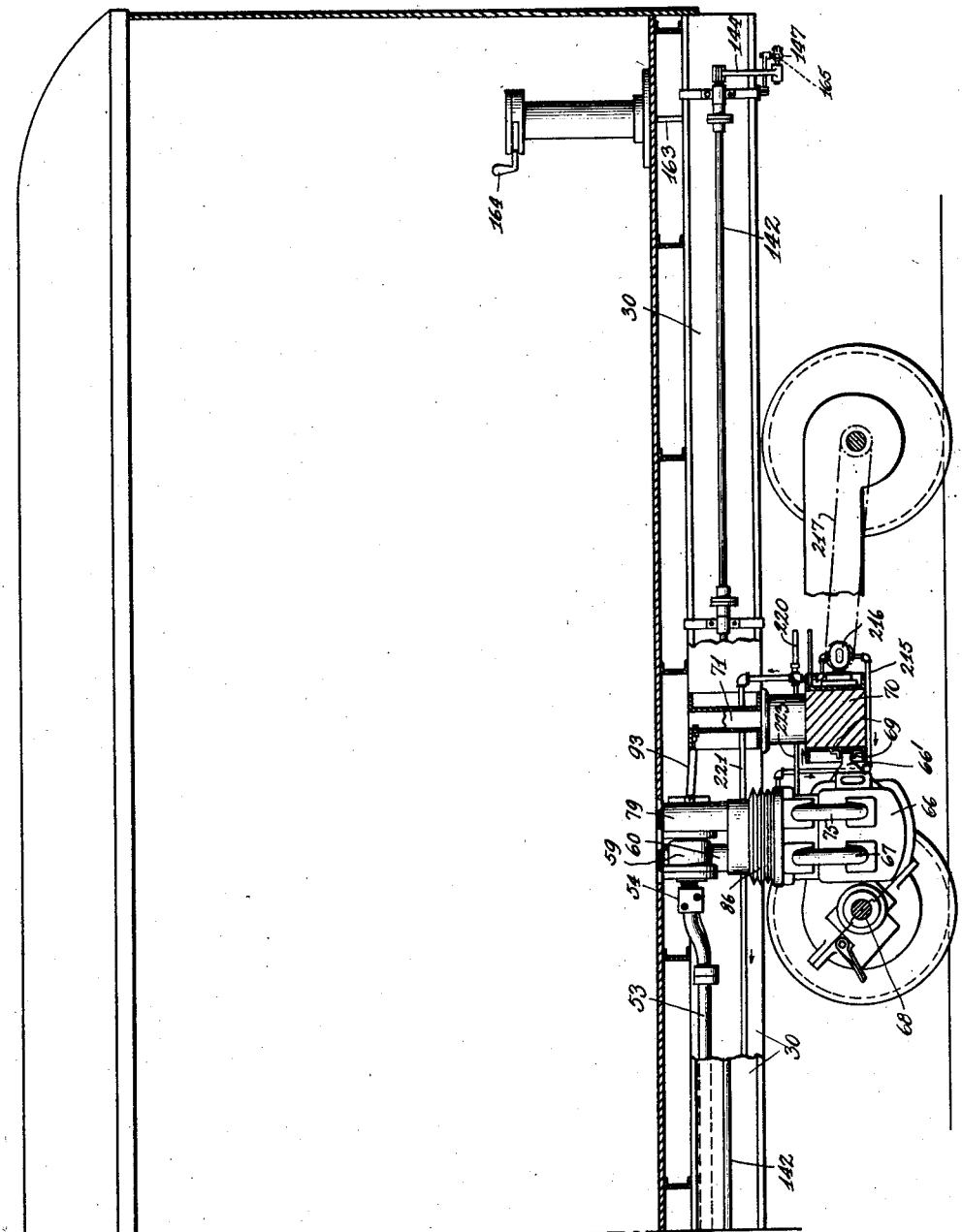
Figure 3:
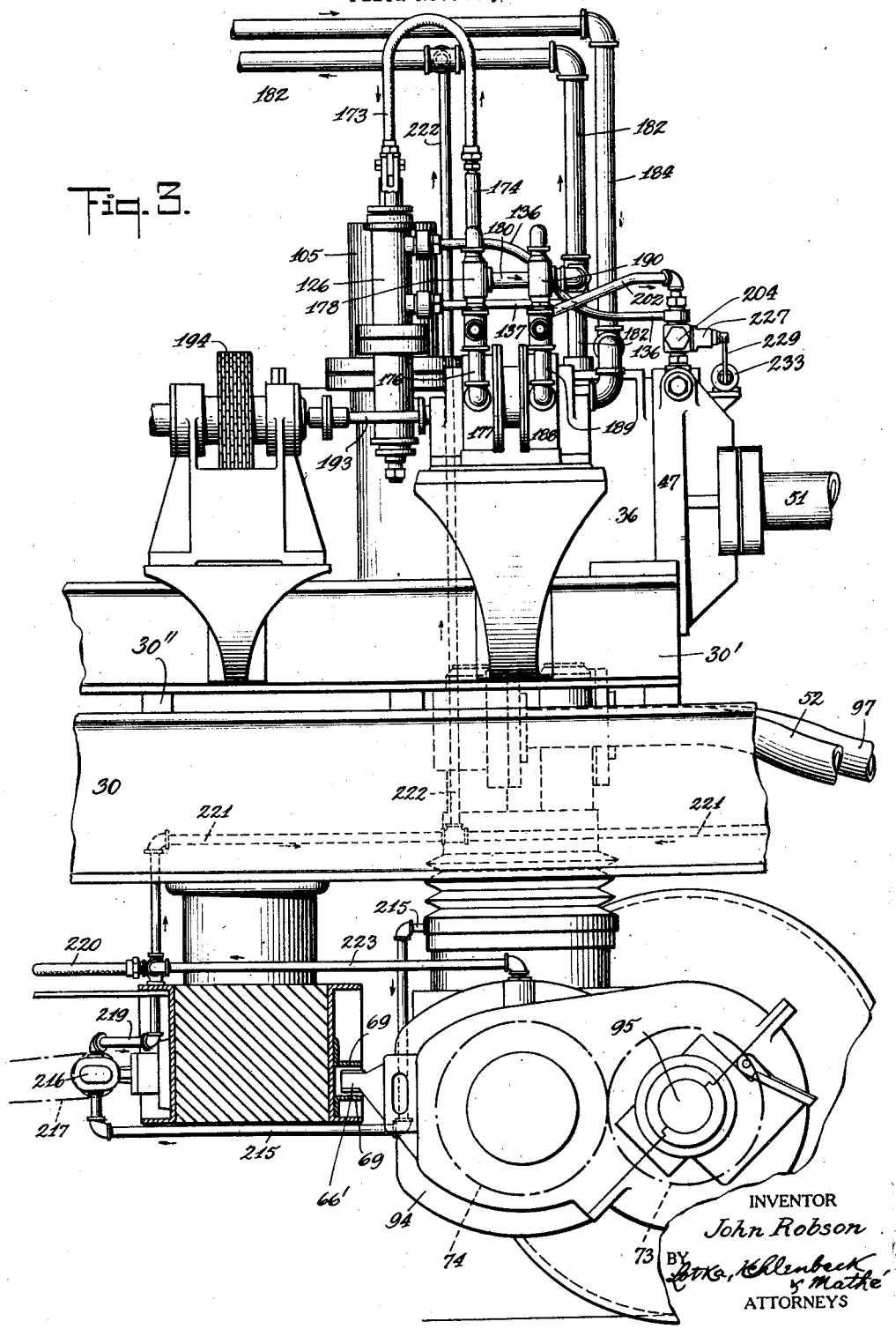
Figure 6:
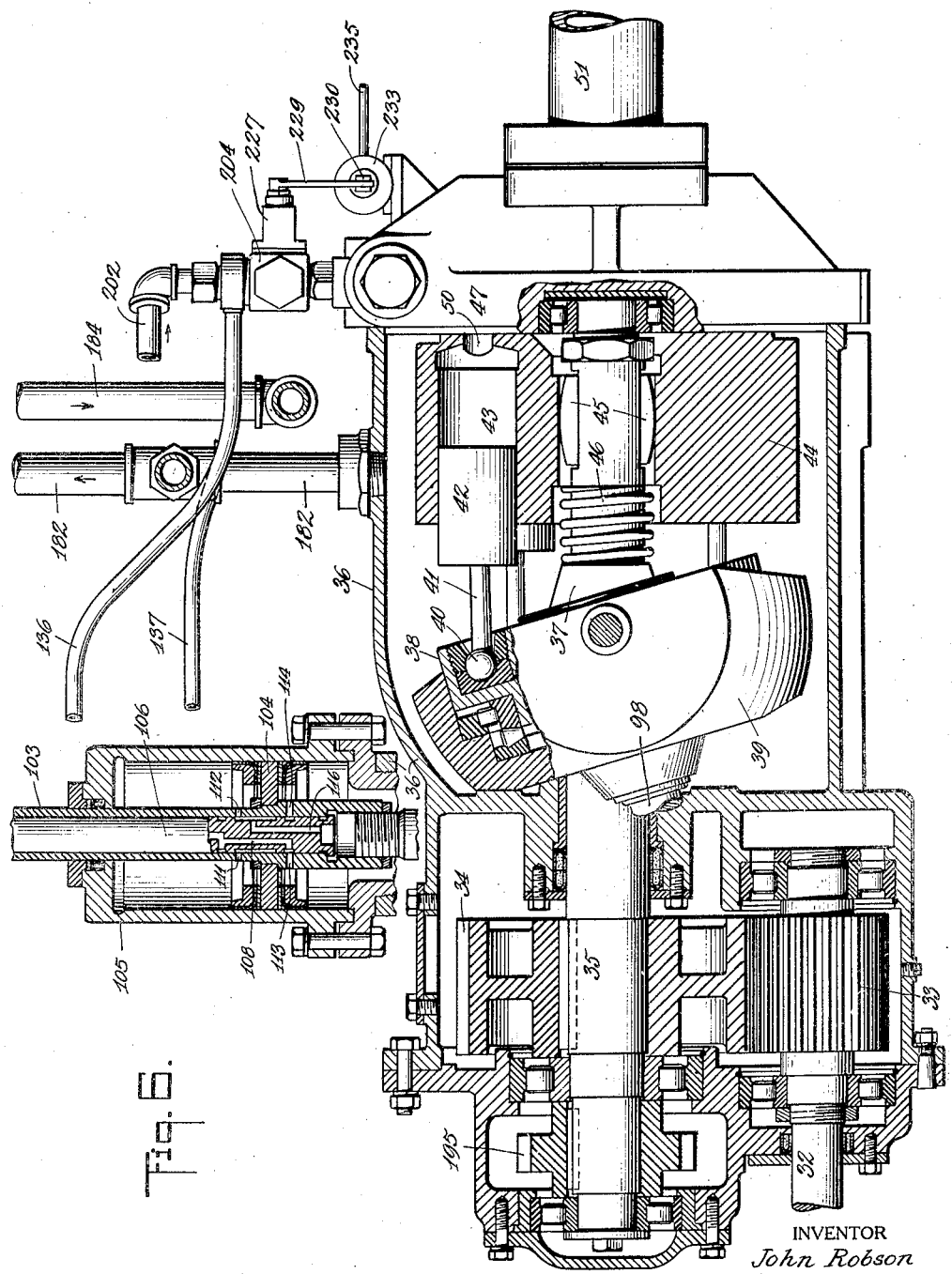
Figure 19:
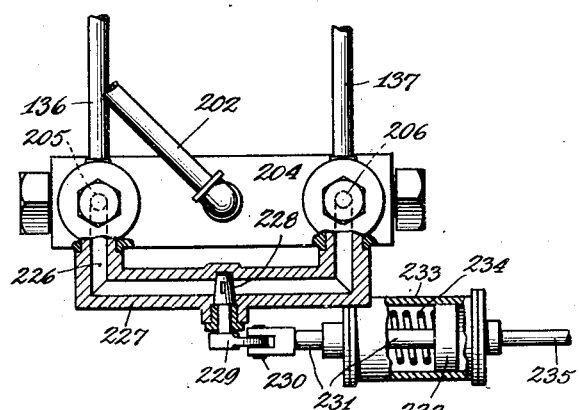
Figure 20:
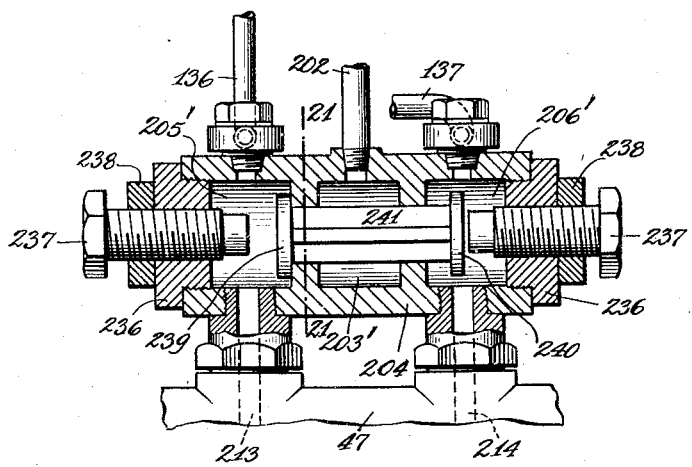
Figure 21:
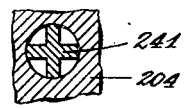

In the said drawings, Fig. 1 is a side elevation of the front portion of a railroad motor car embodying my invention, with parts in section; Fig. 2 is a similar view of the rear portion of such car; Fig. 3 is a side elevation, on an enlarged scale, of a portion shown near the right-hand end of Fig. 1; Fig. 4 is an elevation of the parts at the upper portion of Fig. 3, looking from the right-hand side of Fig. 3; Fig. 5 is a longitudinal vertical section of certain parts at the bottom of Fig. 4, drawn upon an enlarged scale; Fig. 6 is a longitudinal vertical section through the pump section of the power plant and through the servo-motor; Fig. 7 is a side elevation, with parts in section, of the motor driving the rear axle of the car, and certain adjacent parts; Fig. 8 is a transverse vertical section on line 8—8 of Fig. 9, the latter being a plan of the parts shown in Fig. 7; Fig. 10 is a horizontal section of the parts shown at the central portion of Fig. 9; Fig. 11 is a vertical section through the servo-motor, in a position different from that shown in Fig. 6; Fig. 12 is a vertical section through the parts forming the fulcrum for the operating lever of the servo-motor; Fig. 13 is a side elevation, with parts in section, of the mechanism for the manual control of the pump propelling fluid into the motors which drive the car; Fig. 14 is a vertical section on line 14—14 of Fig. 9; Fig. 15 is an enlarged view, showing in vertical section the valve casing 204 of Fig. 4 and the parts contained therein, both views being taken in the same direction; Fig. 16 is a detail section on line 16—16 of Fig. 15; Fig. 17 is a horizontal section on line 17—17 of Fig. 12; Fig. 18 is a diagrammatic view illustrating certain valves and their connections, as set forth hereinafter; Fig. 19 is a plan, with parts in section on line 19—19 of Fig. 15; Fig. 20 is a vertical section showing a modification of the valve structure shown in Fig. 15, and Fig. 21 is a section on line 21—21 of Fig. 20.

On suitable portions 30 of the car frame, near one end of the car, there is supported, (in the embodiment illustrated, through the medium of a sub-frame 30′ and elastic cushions 30″), an internal combustion engine 31 of any appropriate character, the shaft 32 of said engine extending longitudinally of the car and carrying a pinion 33 (Fig. 6) in mesh with a gear wheel 34 on a shaft 35 likewise extending lengthwise of the car. This shaft 35 has one portion within a housing 36, which is the casing of a pump forming part of the variable speed gear. This pump is a rotary pump of variable output, and has not been illustrated fully in all of its details, since it may be of a type now well-known in this art, see, for instance, Harvey D. Williams Letters Patent of the United States No. 925,148 dated June 15, 1909 and No. 1,044,838 dated November 19, 1912. It will be sufficient to say that the shaft 35 is connected by a universal joint structure, a portion of which is indicated at 37, with a socket ring 38 revolving with said shaft and running in a tilting box or race 39 which, by means set forth below, can be inclined to different positions, or brought to stand in such a way that the plane in which the socket ring 38 rotates will be perpendicular to the shaft 35. With said socket ring are engaged the ball ends 40 of connecting rods 41, the other ends of which have ball-and-socket connections with pistons 42. The latter are adapted to reciprocate in chambers or cylinders 43 formed in a barrel 44 held to rotate with the shaft 35, as by means of keys 45. A spring 46 tends to press the shaft 35 in one direction, and the barrel 44 in the other direction, so as to hold said barrel against the end plate or valve plate 47 having two ports 48 and 49 (see Fig. 4) one of which serves as a suction port, and the other as the pressure port, their functions depending on the direction in which the tilting box 39 is inclined. As the barrel 44 rotates, the ports 48, 49 in the stationary valve plate 47 come into successive registry with the reduced openings or ports 50 at those ends of the cylinders 43 which are adjacent to said plate. The port 48 or 49 toward which the pistons 42 move while their cylinders are in communication with such port, is the pressure port, the other port being the suction port at that time. The pump casing 36 and the cylinders 43 contain a fluid, such as oil, suitable for transmitting power by being pumped into and through a motor.

With the port 48 communicates a pipe 51 having a portion 51′ (Fig. 1) of inverted Y shape, the ends of such portion extending toward opposite ends of the car and being connected with longitudinal pipes 52 and 53 respectively. The pipe 53 has its rear end supported in a bracket 54 secured to a portion of the frame 30, and such rear end is formed with a ball 55; (Figs. 7 to 10 inc.) a spring 56, coiled on the pipe, bears with one end against said bracket 54 and with the other against a washer 57 engaging a socket member 58 in contact with the forward face of the ball 55, another socket member 59 engaging the rear face of said ball. The socket member 59 is made rigid or integral with a vertical cylinder 60, in which is slidable up and down a piston or plunger 61 formed with a longitudinal channel 62 the upper end of which has a lateral port in registry with a passage 63 in said member 59, which passage communicates with the port at the rear end of the pipe 53. The lower end of the plunger 61 is formed with a ball 64, having a slight mobility in a socket 65 which is secured to the housing 66 of a motor operated by the fluid propelled by the pump. Said motor is of the same general construction as the pump shown in Fig. 6, or of any other suitable type. Assuming the motor to be of the same general construction as the pump, it will be unnecessary to show or describe the details of the motor, it being understood that Fig. 6 might be taken as an illustration of the motor as well, except that while in the pump (as described below) the inclination of the box 39 may be varied and even reversed, the corresponding inclined track or race of the motor would generally be stationary, as explained in the Williams patents mentioned above. Thus, the motor casing will have two ports corresponding to the ports 48, 49 of Fig. 4, one of these ports of the motor being an inlet for the oil coming from the pump, and the other an outlet for the fluid returning to the pump. One of these motor ports is connected by a pipe 67 with the socket 65, and communicates with the lower end of the channel 62 in the plunger 61. The casing 66 of this motor is supported on one of the axles, 68, of the rear truck, and has a projection 66′ having a slight play (up and down) between two projections 69 on a transom or cross bar 70 of the truck frame, 71 (Fig. 2) indicating the vertical pivot about which said truck frame may swing relatively to the car frame 30. The axle 68 is driven from the shaft 72 of this motor by means of gearing 73, 74. According to the direction in which the motor is driving, the casing 66 will have its projection 66' in engagement either with the upper or the lower projection 69. From the other port of the motor casing 66 a pipe 75, similar to the pipe 67, leads to a socket 76, similar to the socket 65, to communicate with a longitudinal channel 77 in a plunger 78, movable in a cylinder 79 rigid or integral with a socket member 80, the latter having a passage 81 communicating with the channel 77 and with the pipe 82 supported in a bracket 83. A spring 84 bears against said bracket and against a socket member 85, the entire construction being very similar to that shown in Fig. 8. From the lower ends of the cylinders 60, 79 a flexible shield or guard 86, made of leather or other suitable material, extends downwardly to the upper portions or members of the sockets 65, 76, to exclude dust and other foreign matter from the plungers 61, 78 and their joints with such cylinders and sockets. An additional flexible guard 87 serves to close the space between the cylinders 60, 79 and socket members 59, 80 at the top, yet allow a slight movement of these parts toward or from each other. This movement is limited in one direction by chains 88, 89, each having one end attached to the cylinder 60 or 79 respectively, the other ends of such chains being secured to parts on the car frame 30; thus, such other end of the chain 88 is fastened to a projection 90 on the bracket 54, and the corresponding end of the chain 89 is secured to a cross member 91 (Fig. 7) of the car frame. Movement of the cylinders 60, 79 lengthwise of the car in the other direction is limited by metal tubes 92, 93 respectively fitted around said chains 88, 89, one end of each tube engaging the respective cylinder, while the other is adapted to engage the corresponding stationary member 90 or 91 respectively.

The pipe 52 leads forward to parts associated with a motor casing 94 containing a motor that drives the axle 95 of the forward truck, said motor being of the same construction, and having the same connections with the truck frame and car frame as described above in detail with respect to the motor driving the rear axle 68. Similar parts will be readily identified owing to the use of like reference numerals. The pipe 82 leads forward to a pipe 96 (Fig. 4) connected with the pump port 49 and having a portion of inverted Y shape not shown in the drawing, but of the same character as the portion 51' shown in Fig. 1. The other (forward) member of such portion of the pipe 96 leads to a pipe 97 (Fig. 3), it being understood that the pipes 52, 97 have the same function, in regard to the motor contained in the casing 94, that the pipes 53, 82 have with respect to the motor contained in the casing 66; that is to say, one of the pipes 52, 97 conveys the liquid to the inlet port of the motor, while the other receives the liquid from the outlet port of the motor, said motor ports corresponding to the ports 48, 49 of the pump. Each of the two ports of the motor will serve either as inlet or as outlet, depending on the direction in which the motor rotates, and this direction again depends on whether the tilting box 39 of the pump is inclined in the direction illustrated by Fig. 6, or in the opposite direction. As in other devices of this character, the velocity of rotation of the motors, and therefore the speed of the car, depends on the angle which the tilting box 39 forms with the pump axis; when the plane of rotation of the socket ring 38 is perpendicular to the pump axis, the pistons 42 will not reciprocate, and the pump has no output; the greater the inclination of the tilting box, the greater will be the piston stroke, and the greater the pump output and the velocity of the motors.

For adjusting and reversing the inclination of the tilting box 39, the following mechanisms have been provided:

On one side of the shaft 35, the tilting box 39 has an extension 98, shown perpendicular to the plane of rotation of the socket ring 38, and this projection or extension has a sliding fit in a member 99 having a cylindrically-rounded outer surface fitted into suitable guides, such as 100, in a vertically-movable slide or rod 101 passing through a suitable stuffing-box 102 (Fig. 11). On the upper end of the slide rod 101 is screwed or otherwise fastened the piston rod 103 of a servo-motor which also comprises a piston 104 slidable up and down in a cylinder 105 secured to the pump casing 36. The piston rod, to which the piston is secured rigidly, is hollow and receives a plunger valve 106 having a head 107 rigid therewith, said head and plunger valve sliding lengthwise in the piston rod 103, the said head being enlarged exteriorly of the piston rod, to limit the downward movement of the valve 106 relatively to such piston rod, while the upward movement of the valve 106 relatively to the piston rod 103 is limited by the engagement of an enlargement 106' at the bottom of said valve with a suitable internal shoulder of said piston rod. The valve 106 is provided with a longitudinal channel 108 having two lateral branches at different levels, said branches communicating with superposed annular grooves 109, 110 in the outer surface of the valve. Fig. 11 shows the valve in the neutral position, with its upper and lower enlargements about equally distant from the piston rod portions that limit the movement of such valve. In this neutral position, the grooves 109, 110 are out of registry with the four ports 111, 112, 113, 114, provided in the piston rod 103, the ports 111, 112 being above the piston 104, and the ports 113, 114 below the same, and the distance between the ports 111, 113 being smaller than the distance between the grooves 109, 110. The valve 106 has an intermediate relatively wide annular groove 115 which in the neutral position illustrated is covered or closed by the valve surface or "land" between the upper ports 111, 112 and the lower ports 113, 114. This intermediate groove 115 communicates with another channel 116 leading downwardly to the chamber 117 at the lower end of the piston rod 103, said chamber communicating with a longitudinal channel 118 in the slide rod 101, and by way of such channel with the interior of the oil-filled pump casing 36. The head 107 has an annular external groove into which project the inner ends of aligning pins 119 carried by one end of a forked lever 120 (Figs. 4, 11, and 12) which, at 121, has a pivotal connection, parallel with the axis of the pins 119, with the forked upper end 122 of a rod 123 mounted to slide up and down in stuffing boxes 124, 125 at the top and bottom respectively of a cylinder 126 suitably carried by the car frame. Within this cylinder are held stationary two sleeves or linings 127, recessed annularly on their outer surfaces so as to form annular chambers 128. The inner diameter of the sleeves 127 is so much larger than the rod 123 that the latter will be spaced from the sleeves to form interior annular chambers 129, but said rod 123 has an enlarged intermediate portion 123' which has a piston-like fit within the two sleeves 127. The upper chamber 128 communicates with the upper chamber 129 by a port 130, and a similar port 131 connects the two lower chambers 128 and 129. The two chambers 128 further communicate with channels 132 in plugs 133, each channel 132 communicating, by means of a small hole or bleeding hole 134 (Fig. 17) with a chamber 135 connected with a pipe 136 or 137 respectively (Fig. 4).

At the end opposite to the servo-motor, the lever 120 has a pivotal connection 138, parallel to its other pivotal connections, with an upright link 139, the lower end of which is pivotally connected at 140 with a crank arm 141 on a control shaft 142 suitably supported in bearings on the car frame 30 and extending lengthwise practically from one end of the car to the other, see Figs. 1, 2, and 4. At each end of the car, such rock-shaft 142 has a crank arm 143, 144 respectively, having a pivotal connection, as at 145 (Fig. 4), with a rod 146 or 147 respectively, extending transversely of the car. Inasmuch as this mechanism is practically the same at each end of the car, a description of the mechanism at one end, shown in Figs. 1, 4, 5, and 13 will suffice. The rod or link 146 is connected pivotally at 148 with a sliding rod 149 movable in a stationary guide 150. The latter has an interior shoulder against which is adapted to bear a collar 151 also adapted for engagement with a shoulder formed on the slide 149 by making it with a reduced portion 149', on which is coiled a spring 152 one end of which bears against said collar 151. The other end of said spring engages a similar collar 153 having a sliding fit on said portion 149' and adapted to engage a head 154 screwed or otherwise secured to the free end of said portion 149' and sliding in the guide 150. The collar 153 is also adapted to engage a shoulder or projection 150' on the guide 150. In the normal, neutral position illustrated by Fig. 5, the spring 152 keeps both collars 151 and 153 in contact with the parts 149 and 154 and at the same time with the two shoulders on the guide 150. The outer end of the head 154 has a pivotal connection at 155 with the forked end of a link 156, the other end of which is likewise forked and has a parallel pivotal connection 157 (Fig. 13) with an arm 158 on a vertical rock-shaft 159 journaled in a stationary bearing 160. On said shaft 159 is secured rigidly a sector 161 having teeth in mesh with those of a pinion 162 mounted on a shaft 163 the upper end of which carries a hand wheel 164. While the two mechanisms operated by the respective hand wheels 164 might be exactly alike, it is not necessary to duplicate the parts 149', 150, 150', 151, 152, 153, 154, 155, but at one end of the car these parts might be omitted, the parts 149 and 156 being rigid or integral with each other at this end, and universal joints (for instance, ball-and-socket joints, one of which is indicated at 165 in Fig. 2) being used instead of the pivot joints 145 and 157.

At its lower end the rod 123 has a reduced portion 123", thus forming a shoulder against which a collar 166 (Fig. 12) is adapted to abut under the influence of a coiled spring 167 contained in a housing 168. This collar is also adapted to abut against the lower stuffing box 125. The lower end of the spring 167 bears against a collar 169 which, like the upper collar 166, is adapted to remain stationary at times while the rod 123 moves lengthwise, as will be explained below. The lower collar 169 is adapted to engage a nut 170 screwed on the lower end of the reduced rod portion 123", and is also adapted to engage a stationary stop formed by a sleeve or bushing 171 screwed into the lower end of the housing 168. A sleeve 172 interposed between the collars 166 and 169 limits the distance to which said collars 166, 169 may approach each other.

The channel 108 of the valve 106 communicates, by a hose or flexible pipe 173 (Figs. 3, 4, and 11), with an upright pipe 174 connecting with a horizontal pipe portion 175 branched off from the delivery pipe 176 of a pump 177. This delivery pipe also communicates with a casing 178 which contains a valve 179 of any well-known or approved construction adapted to open when the pressure in the pipes 176, 175 exceeds a definite figure, for instance 50 pounds per square inch above atmospheric pressure, such valve therefore acting as a relief valve to discharge the surplus oil (in the event the pressure rises above said figure) into an outlet pipe 180 connected with a transverse pipe 181 from which a pipe 182 leads to the upper portion of an expansion tank 183 (Fig. 1), preferably above the level of the liquid therein, the upper portion of said tank communicating with the surrounding air. From the lower portion of said tank 183 a pipe 184 leads down to a transverse pipe 184 having a branch 186 to the suction port of the pump 177.

Another branch 187 leads from the pipe 185 to the suction port of another pump 188, which may be similar to the pump 177, the delivery pipe 189 of said pump 188 leading to the casing 190 of a relief valve 191, similar to the valve 179 in function, but set to open at a much lower pressure, for instance, five pounds to the square inch (above atmospheric pressure). When the valve 191 opens, fluid will pass from the pipe 189 through the casing 190 and from the outlet of the latter through a branch pipe 192 into the transverse pipe 181, to reach the upper portion of the expansion tank 183, in the same manner as any oil passing through the casing 178 when the relief valve 179 opens.

The two pumps 177, 188 are operated by means of a countershaft 193 extending lengthwise of the car and driven in any suitable manner, for instance by means of a link-belt or chain 194 engaging a sprocket wheel on said countershaft and another sprocket wheel 195 on the pump shaft 35. The shaft 193 may also be utilized to actuate various other parts of the car, for instance a compressor 196 (Fig. 1) to supply air for the operation of the usual air-brake (not shown), and a fan 197 mounted to rotate about a horizontal axis 198 and operated by a transmission member (belt, etc.) 199, said fan drawing air from the front of the car through a suitable opening, and forcing such air through the engine radiator 200, the air being then discharged at the top of the car, through a channel 201.

From the pipe 189, that is to say, from a conduit in which a pressure of five pounds above atmospheric pressure is maintained by the pump 188, a pipe 202 (Figs. 3, 4, and 15) leads to the central chamber 203 of a valve casing 204, the end chambers 205 and 206 of which communicate with the pipes 136 and 137 respectively. These end chambers contain two guides 207 having guide surfaces 208 for ball valves 209, 210 adapted to open toward the respective end chambers 205, 206 and to become seated toward the central chamber 203, Fig. 15 showing the valve 210 seated so that it closes the communication between the central chamber 203 and the end chamber 206. The outward movement of each ball valve is limited by a suitable stop, such as a shoulder 211 on the respective guide 207, the latter being provided with a longitudinal passage 212 of sufficient width to allow the fluid to pass through whenever the valve is open, even if it engages the stop shoulder 211, as indicated for the valve 209 in Fig. 15. The end chambers 205, 206 also communicate permanently, by ducts 213, 214 respectively, with the ports 48 and 49 respectively of the valve plate 47 of the pump forming part of the variable speed gear.

The following mechanism, shown chiefly in Figs. 1, 3, 7, 8, and 9, is employed for replenishing leakage, particularly in connection with the ball joints at the lower ends of the plungers 61, 78: Any oil that may leak into the chamber surrounded by the guard 86, will be drawn through piping 215 to the suction port of a pump 216 (there being one such pump on each of the trucks of the car), said pump being supported on the truck frame, and driven in any suitable manner, for instance by means of a chain 217 operating in conjunction with the axle 218 of said truck, that is, the axle which is not driven by the motor. Inasmuch as the car may travel in either direction, the pumps 216 should be of such construction that the port connected with the pipe 215 will always be the suction port, irrespective of the direction in which the pump rotates. Centrifugal pumps and some other types fulfil this requirement. With respect to the pumps 177 and 188, it is not necessary that they be of a construction operating equally well in either direction, for the reason that these two pumps are driven by a shaft (193) which always rotates in the same direction, in view of its operative connection with the shaft of an internal combustion engine. The delivery port of the pump 216 is connected by piping 219 supported on the truck frame, with a hose or other flexible connection 220 the outlet of which is connected with longitudinal piping 221 supported on the car frame. The hose 220 thus provides proper flexibility between the piping sections supported by the truck frame and by the car frame respectively. The opposite ends of the piping 221 are connected with the discharge ends of the hose connections 220 at the two trucks. At some intermediate point, the pipe 221 is connected by a branch 222 with the pipe 182 leading to the upper portion of the expansion tank 183.

From the upper portion of the motor housing 66 a pipe 223 (Figs. 3, 7, and 9) leads to the delivery pipe 219, near its junction with the flexible connection 220. From the delivery pipes 176, 189 of the pumps 177, 188 respectively, pipes 224 and 225 respectively (Figs. 4 and 18) may lead to suitable pressure-gauges (not shown) in the engineer's cab, or near his stand.

The main features of the operation will be readily understood without any lengthy explanation. The pump contained in the casing 36 will deliver fluid under pressure either through the pipe 51 or the pipe 96, to the two motors contained in the casings 66, thereby driving both the front axle 95 and and the rear axle 68. Since the shaft 35, being driven by an internal combustion engine, always rotates in the same direction, it follows that the said two motors will rotate in one direction when the tilting box 39 is inclined as shown in Fig. 6, and in the opposite direction when the said box is given the opposite inclination. Thus the car will be caused to travel either forward or backward by giving the tilting box 39 the proper direction of inclination. The speed of the car will be controlled by varying the inclination of said tilting box, and when the socket ring 38 revolves in a plane perpendicular to the shaft 35, the output of the pump will be zero, that is to say, the car will be stopped although the engine and the pump barrel 44 will continue to run. The spring 152 (Fig. 5) and the associated parts are so constructed as to tend to bring the tilting box (through the connections indicated in Figs. 4 and 11) into said perpendicular or neutral position. That is to say, supposing the pump is in operation and causes the motors to drive the car (with the slide or rod 101 in such a position as to incline the socket ring 38) and the engineer owing to sudden illness or for any other reason lets go of the handwheel 164, the spring 152 will automatically bring back the handwheel to the neutral position, and the socket ring 38 to the position in which it revolves without causing the pistons 42 to reciprocate. An efficient safeguard is thus provided against serious accidents.

When the car is to be started, the engineer turns the handwheel from the neutral (central) position to one side or the other, according to the direction (forward or backward) in which the car is to travel. As the handwheel is thus operated, it will, through the mechanism shown in Fig. 13, impart a longitudinal motion, in one direction or the other, to the rod system 156, 149 (Figs. 4 and 5), or to the corresponding rod system at the other end of the car, if the engineer is operating the car from that end. In either event, the shaft 142 will be rocked in one direction or the other, and whether the rod system 149, 156 is moved directly through the handwheel 164 at the forward end of the car, or indirectly by the rocking of the shaft brought about by the operation of the handwheel at the rear end of the car, the said rod system 149, 156 will be moved lengthwise to compress the spring 152, so that the latter will tend to restore the parts to the neutral position, upon the release of the handwheel. When the rod system 149, 156 of Fig. 5 moves from left to right, the collar 153 will remain stationary, while the collar 151 will move lengthwise with said rod system; if the movement is from right to left, the collar 151 will remain stationary, and the collar 153 will move in unison with said rod system. As the shaft 142 is thus rocked, it will, by the mechanism indicated in Fig. 4, cause the lever 120 to swing in one direction or the other on its fulcrum 121, which will remain stationary under normal conditions. The pins 119 (Fig. 11) will thus be carried up or down, and with them the valve 106, from the normal position illustrated by Fig. 11. It will be noted that in such normal position, the channel 108 is out of communication with the cylinder 105, as is also the channel 118. Now let us suppose that the lever 120 is moved in such a direction as to raise the valve 106 in the piston rod 103, to the position shown in Fig. 6. This will bring the port or groove 110 in registry with the ports 113 and 114, below the piston 104, while at the same time the ports 111 and 112, above said piston 104, will be brought into registry with the groove 115 of the valve 106. Thus oil under pressure from the pump 177 (say, at a pressure of fifty pounds above atmospheric pressure) will pass through 176, 175, 173, 108, 110, 113 (Figs. 4, 11, and 18) into the compartment of cylinder 105 below the piston 104, tending to raise said piston, and with it the slide or rod 101, to adjust the tilting box 39 to an inclined position. At the same time, the enlargement 106' at the lower end of the valve 106 will engage the internal shoulder of the piston rod 103, and the latter, together with the slide 101, will thus be raised, both by the direct energy exerted by the engineer through the lever 120 and valve 106, and by the pressure of the fluid admitted under the piston 104 as described. This servo-motor construction therefore renders the adjustment of the tilting box much easier than if the engineer had to rely entirely on his own strength to shift the tilting box, which not only is relatively heavy, but also opposes a rather considerable resistance to changing its position, whenever the socket ring 38 and associated parts rotate at a high rate of speed. Of course, if the lever 120 is swung so that the valve 106 will be moved down instead of up, the channel 108 will be shifted in such manner as to admit fluid under pressure (from the pump 177) above the piston 104 (instead of below the same), thus again assisting the engineer in shifting the valve 106 in the desired direction. As fluid under pressure passes into the compartment above or below the piston 104 from the channel 108, the fluid will escape from the other compartment of the cylinder either through the ports 113 and 114 or through the ports 111 and 112 respectively, which at such time will register with the valve groove 115, so that the fluid can escape through the channel 116 into the channel 118 and into the casing 36.

The automatic pressure control operates as follows through an upward or downward shifting of the fulcrum 121: Normally, said fulcrum may be assumed to be in the position illustrated by Fig. 12, which position is determined by the tension of the spring 167. As explained above, the two channels 132 communicate with the pipes 136, 137 and through them with the pump ports 213, 48, and 214, 49 respectively, (Figs. 15 and 4), one of said pump ports being the pressure port at that time, and the other the suction port. Now let us assume that the upper channel 132 is connected with the pressure port of the pump, and that on account of increased load, or for any other reason, the pressure rises in the delivery connection of the pump. When this increase becomes sufficient to overcome the influence of the spring 167, the plunger portion 123' and with it the rod 123 and the fulcrum 121 will be moved downward automatically, thus swinging the lever 120 on the pivot 138 as a temporary fulcrum, and changing the inclination of the tilting box 39 in such a direction as to reduce the output of the pump. Upon a subsequent decrease of pressure in the delivery connection of the pump, the spring 167 will move the rod 123 back toward the normal position, thus again increasing the inclination of the tilting box, that is to say, causing the pump output to increase. The result will be similar if the pump port communicating with the lower channel 132 happens to be the pressure port at the time, except that in this case an increase of pressure in the delivery connection of the pump will shift the fulcrum rod 123 upward instead of downward. In the one case, the collar 166 will remain stationary, while the collar 169 will move with the spring, and in the other case the collar 169 will remain stationary, while the collar 166 will move in unison with the spring 167. The sleeve 172 will limit the extent to which said spring may be compressed.

Whenever the lever 120 is thus swung on the pivot 138 by an upward or downward movement of the rod 123, the shaft 142 will not be rocked, but the valve 106 will be moved up or down (in the same direction as the rod 123), and the shifting of such valve will, by co-operation with the piston rod 103, operate the piston 104 in substantially the same manner as described above in connection with the manual control effected by means of either of the hand-wheels 164. As stated above, the upward movement of the valve 106 relatively to the piston rod 103 is limited by the enlargement 106' working in conjunction with an interior shoulder on the piston rod; the downward movement of said valve relatively to the piston rod 103 is limited by the engagement of the upper end of said rod with the enlarged head 107.

The low-pressure pump 188 delivers oil under a relatively light pressure (say, five pounds above atmospheric pressure), through the pipes 189 and 202 (Fig. 18) to the central chamber of the valve casing 204 (Fig. 15). Said central chamber 203 is shut off from that end chamber 205 or 206 which at that time communicates with the delivery port or pressure port of the main pump. If for instance the port 49 (Fig. 4) is the delivery port, the pressure exerted in chamber 206 through the channel 214 will close the valve 210. On the other hand, under these conditions the valve 209 will be open, that is to say, the central chamber 203 is in communication with the suction port 48 of the pump. If the flow is reversed in the pump, so that 48 becomes the pressure port, and 49 the suction port, the valves 209, 210 will likewise change their positions. In either event, the fluid supplied under a light pressure to said chamber 203 from the pump 188, will reach the suction port of the main pump as well as all the piping connected with such port. Thus in the case of a leak developing at any portion of the liquid-circulating path which is under suction, the oil will pass out through the leak, and while there will be some loss of oil, at least the operation will not be interrupted; on the other hand, if the separate source of pressure were not provided, then, in the event of a leak in the suction connection between the pump and the motors (return connection), air would enter through the leak, and such air would seriously interfere with the operation of the hydraulic power transmission, or even stop it altogether.

Should the delivery pressure of the pump 188 at any time rise above the predetermined figure (five pounds above atmospheric pressure, in the example given), the valve 191 will open to allow a relief of pressure through the pipes 192 and 182 (Fig. 18) into the expansion tank 183 (Fig. 1). Similarly, if the delivery pressure of the pump 177 should exceed the desired limit (for instance, fifty pounds above atmospheric pressure), the valve 179 will open to allow the surplus oil to pass to the upper portion of the expansion tank 183 through the pipes 180 and 182. The oil which reaches the interior of the casing 36, either through the channel 118 of the servo-motor, as described above, or by leakage between the barrel 44 and the valve plate 47, will rise in the pipe 182, the lower end of which communicates with the upper portion of said casing (Figs 4 and 6), so that the oil from these sources also will be conveyed to the upper portion of the expansion tank. Both pumps 177 and 188 draw oil from the lower portion of the expansion tank, through the pipes 184, 185, 186, and 187, and a circulation is thus established to keep all parts well supplied with oil, and also to cool the oil to a certain extent, it being understood that the oil gets heated, both in the pumps and in the motors. Any oil passing out through one of the channels 132 (Fig. 12) during the movement of the plunger rod 123, returns to the pump port 48, or 49, whichever is the suction port at the time, passing in one case through the pipe 136, chamber 205, and channel 213, and in the other case through the pipe 137, chamber 206, and channel 214. The small hole 134 (Fig. 17) connected with each of the channels 132 retards the flow of the fluid to and from the two chambers 129, and by this cushioning effect prevents too sudden a movement of the speed-varying mechanism when operated automatically by an excessive rise of the delivery pressure of the main pump.

It will also be understood that as the oil filling the casing 36 becomes heated by the operation of the power plant, it will expand and rise in the pipe 182 to overflow into the expansion tank when the upper end of said pipe is reached.

The pipe 182 further receives, and discharges into said expansion tank, the oil which the pumps 216 deliver into the pipes 221, 222 (Figs. 3, 4, and 9), as well as the oil which, owing to expansion produced by the heat of the operation, may leave the motor casings 66 and 94, through the corresponding pipes 223, which, as described, are connected with the delivery pipes 219 of the pumps 216, which pipes are connected to the above-mentioned pipe 221 by the flexible hose connections 220 (see also Fig. 7). The pumps 216 draw oil through the pipes 215 (Figs. 3, 7, 9, and 14) from the catch reservoirs which are formed by the flexible guards 86, 87 and the adjacent parts, said reservoirs collecting the leakage from the joints at both ends of the pistons or plungers 61, 78.

The features affording the desired flexibility in the oil connections will be readily understood. The plunger 61, 78 not only enable the pipes 53, 82, and adjacent parts (which are carried by the main car frame 30) to move up and down relatively to the motors 66, 94 and their inlet and outlet connections 67, 75, (which are carried by the respective truck frames, relatively to which the car frame 30 is movable), but owing to the ball and socket connections at the lower ends of said plungers (Fig. 8), a certain amount of mobility or sway is permitted, both lengthwise of the car and transversely. Furthermore, the ball and socket connections at the ends of the pipes 53, 82 (Fig. 10) will allow a universal movement at these points. Again, the cylinders 60, 79 and parts associated therewith, may move lengthwise of the car within certain limits determined by the length of the chains 88, 89 and (in the other direction) of the tubes 92, 93. Finally, the flexible connections 220 (Figs. 2, 7, and 9) allow the pipe 221 (carried by the car frame 30) to move relatively to the pipes 219, 223 (carried by the truck frame). Therefore, notwithstanding the relatively great length of the car illustrated by the accompanying drawings, all the piping which carries the oil to the several parts will have sufficient flexibility to follow all the movements of the car frame relatively to the truck frames, without placing any undue strain on the joints, so that a permanent tightness of the joints will be assured.

It will be noted that in setting the speed control by manual operation, the engineer does not shift the parts exclusively by muscular power, in fact, he uses muscular power only to initiate the movement of the servo-motor, the main movement being brought about by fluid-pressure (produced by a separate pump). The parts are so heavy that it would be difficult (also on account of the pressure that such movement would create in the upper or lower portion of cylinder 105, Fig. 11, if the valve 106 is moved upward or downward in the absence of pressure in the channel 108) for the engineer to adjust these parts, and almost impossible in many cases. Thus, if the engine happened to stall with the pump socket ring in the inclined position shown in Fig. 6, the engineer would find it practically impossible to bring this ring to the neutral (perpendicular) position by manual effort, yet the engine can not be started unless the socket ring is in or about such neutral position. To overcome this difficulty, I have provided the by-pass construction illustrated particularly in Fig. 19, and also indicated in Figs. 1, 3, 4, and 6. Here a by-pass channel 226, formed in a casing 227, connects the two end chambers 205, 206 at such times as a valve 228, controlling said by-pass, is open. Normally, said valve 228 is closed, so that the presence of the by-pass and of its controlling valve will not affect the operation set forth above. In case, however, the engine becomes stalled under conditions such as set forth above, or if for any reason the socket ring of the pump is found inclined to such a degree as to render starting of the engine impossible or difficult, the engineer will bring the valve 228 to the open position, and by thus connecting chamber 205 with chamber 206 also connect the two pump ports 48 and 49. The engine can then be started with comparative ease, for the reason that the resistance which the pump opposes to the starting of the engine when the fluid propelled by the pump is compelled to pass through the motors, is largely if not entirely done away with by the short-circuiting afforded by the by-pass connection. Any suitable means may be employed to enable the engineer to operate the valve 228 when desired. Simply putting a handle on the said valve would not be desirable, with the arrangement of parts shown, since such handle would be difficult of access, so some intermediate mechanism is provided, extending from the valve 228 to the engineer's cab or stand. As an example of the many forms which may be adopted for this purpose, I have shown a crank arm 229 on the spindle of the valve 228, said arm being pivotally connected at 230 with a rod 231 secured to a piston 232 sliding in a cylinder 233. A coiled spring 234 tends to move the piston in such a direction as to close the by-pass valve 228, this being the normal position, as stated above. The piston may be moved in the other direction, to open the valve, by admitting fluid under pressure through a pipe 235; this pipe may be connected for instance with one of the reservoirs containing compressed air for operating the brakes of the car, the admission of the compressed air to the pipe 235 being controlled by a cock or other suitable device (not shown) under the engineer's control and within his easy reach from his post.

In Figs. 20 and 21 I have shown a valve construction which may be used as an alternative of the one illustrated by Fig. 15. The parts 47, 136, 137, 202, 203', 204, 205', and 206' are of substantially the same construction as in Fig. 15. The end chambers 205', 206' are closed, at their outer ends, by plugs 236 into which are fitted screws 237 held, after longitudinal adjustment, by lock nuts 238. The inner ends of these screws form adjustable stops for limiting the outward movement of the two valves 239, 240, which have the same functions as the ball valves 209, 210 of Fig. 15, that is, they control the communication of the central chamber 203' with the end chambers 205' and 206' respectively. The two valves 239, 240 are connected by a shank or stem 241 of cross-shaped cross-section (Fig. 21) guided on suitable surfaces of the casing 204. This stem holds the valves at such a distance from each other that only one of said valves can be seated at a time. The operation will be the same, in effect, as when employing the construction shown in Fig. 15. An additional advantage of the construction shown in Figs. 20 and 21 is that the valve structure 239, 240, 241 may be brought to, and held in, a position in which both valves 239 and 240 will be open, so as to maintain communication between the chambers 205', 206' and therefore between the pump ports 48, 49. This possibility is useful in making adjustments. The valve structure is brought to this inactive position by adjusting the screws 237 inwardly until their inner ends will prevent the valves 239, 240 from becoming seated. Thus, if the right-hand screw 237 (Fig. 20) is adjusted inwardly, its inner end will lift the valve 239 off its seat. Similarly, inward movement of the left-hand screw 237 will prevent the valve 240 from becoming seated.

It will be understood that the by-pass arrangement explained with special reference to Fig. 19, may be used in conjunction with the valve structure of Figs. 20 and 21, as well as with that of Fig. 15.

As explained above, the provision of the by-pass 226 controlled by the valve 228 is useful in that it enables the engine to be started readily even if the socket-ring of the pump should happen to be in an inclined position instead of the neutral (vertical) position. Another advantage of this by-pass and valve is that it enables the car to coast while going down hill, by relieving (when the by-pass is open) the transmission mechanism of a large part of the friction of the engine.

Various modifications may be made without departing from the nature of my invention as set forth in the appended claims.

I claim as my invention:

1. In a power plant, a pump of the variable output type, a motor adapted to be operated by the fluid propelled by said pump, a delivery connection for conveying fluid from the pump to the motor, a return connection for conveying fluid from the motor to the pump, mechanism for varying the output of the pump, said mechanism including a lever, a servo-motor connected with said lever at a distance from its fulcrum, a separate pump for supplying fluid under pressure to said servo-motor, the latter having an outlet through which the fluid may pass from the servo-motor to the first-mentioned pump, and means for actuating said lever to operate the servo-motor and change the output of the first-mentioned pump.

2. In a power plant, a pump of the variable output type, a motor adapted to be operated by the fluid propelled by said pump, a delivery connection for conveying fluid from the pump to the motor, a return connection for conveying fluid from the motor to the pump, mechanism for varying the output of the pump, said mechanism including a lever, a plunger on which said lever is fulcrumed, a cylinder in which said plunger is movable a servo-motor connected with said lever at a distance from its fulcrum, said servo-motor having an outlet through which fluid may pass therefrom to the aforesaid pump, a separate pump for supplying fluid under pressure to said servo-motor, means for the manual operation of said lever to actuate the servo-motor, the fulcrum of the plunger remaining stationary during such manual operation, a channel leading from the delivery connection to said cylinder on one side of the plunger, to cause the latter to be operated in response to variations in said delivery pressure, and a separate source of fluid under pressure having a connection leading to said cylinder on the opposite side of said plunger.

3. In a self-propelled vehicle, wheeled trucks, a fluid-operated motor on one of said trucks, to drive the same, a main frame supported on said trucks movably, a power-operated pump supported on said main frame, conduits for conveying the fluid from the pump to the motor, and back from the motor to the pump, said conduits including movable joints, a flexible casing surrounding said joints, a pump for withdrawing leakage that escapes at said joints and restoring it to the main circulation path, and a pipe leading from said casing to said pump.

4. In a self-propelled vehicle, wheeled trucks, a fluid-operated motor on said trucks, to drive the same, a main frame supported on said trucks movably, a power-operated pump supported on said main frame, conduits for conveying the fluid from the pump to the motor, and back from motor to the pump, said conduits including movable joints, a reservoir for collecting leakage escaping at such joints, a flexible casing enclosing said joints and reservoir, and a pump for withdrawing fluid from said reservoir and restoring such fluid to the main circulation path.

5. In a self-propelled vehicle, wheeled trucks, a fluid-operated motor on one of said trucks, to drive the same, a main frame supported on said trucks movably, a power-operated pump supported on said main frame, conduits for conveying the fluid from the pump to the motor, and back from the motor to the pump, said conduits including movable joints, a reservoir for collecting leakage escaping at such joints, a pump for withdrawing fluid from said reservoir and restoring such fluid to the main circulation path, said pump being of the type which delivers fluid in the same direction irrespective of the direction in which the pump is driven, and an operatve connection from one of the vehicle wheels to said pump.

6. In a power plant, a pump of the variable output type, a motor adapted to be operated by the fluid propelled by said pump, connections for conveying fluid from the pump to the motor, and back from the motor to the pump, a handwheel or equivaient device having movement in two directions adapted to be operated by the engineer, mechanism, actuated through the medium of said handwheel, for effecting a change in the output of the pump, said mechanism including a connecting rod and a casing, each having a pair of spaced abutments, and a single spring, mounted on said rod between said abutments, which, upon the release of the handwheel, will bring the latter after movement in either direction automatically to a position adjusting the pump to a condition in which its output is nil.

In testimony whereof I have signed this specification.

JOHN ROBSON.